US012578676B2

(12) United States Patent
Fukamachi et al.

(10) Patent No.: US 12,578,676 B2
(45) **Date of Patent: *Mar. 17, 2026**

(54) IMAGE FORMING APPARATUS INCLUDING DEVELOPING GUIDE FOR GUIDING ATTACHMENT AND DETACHMENT OF DEVELOPING CARTRIDGE TO AND FROM MAIN BODY HOUSING

(71) Applicant: BROTHER KOGYO KABUSHIKI KAISHA, Nagoya (JP)

(72) Inventors: Yasuo Fukamachi, Nagoya (JP); Kazutoshi Nakamura, Kuwana (JP); Masaaki Furukawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,254

(22) Filed: Jul. 17, 2024

(65) Prior Publication Data

US 2024/0369965 A1 Nov. 7, 2024

Related U.S. Application Data

(63) Continuation of application No. 18/359,400, filed on Jul. 26, 2023, now Pat. No. 12,092,991, which is a (Continued)

(30) Foreign Application Priority Data

Mar. 27, 2019 (JP) ................................ 2019-059870

(51) Int. Cl.

*G03G 21/16* (2006.01)
*G03G 15/08* (2006.01)
*G03G 21/18* (2006.01)

(52) U.S. Cl.

CPC ..... *G03G 21/1814* (2013.01); *G03G 15/0863* (2013.01); *G03G 21/1652* (2013.01)

(58) Field of Classification Search

CPC ........... G03G 15/0863; G03G 21/1652; G03G 21/1814

See application file for complete search history.

(56) References Cited

U.S. PATENT DOCUMENTS

2006/0024080 A1 2/2006 Chadani et al.
2008/0159772 A1 7/2008 Koishi et al.
(Continued)

FOREIGN PATENT DOCUMENTS

JP 2001-356553 A 12/2001
JP 2005-164625 A 6/2005
(Continued)

OTHER PUBLICATIONS

International Search Report and Written Opinion issued in related PCT/JP2019/022713, mailed Aug. 13, 2019.
(Continued)

*Primary Examiner* — Hoang X Ngo
(74) *Attorney, Agent, or Firm* — Merchant & Gould P.C.

(57) ABSTRACT

An image forming apparatus includes: a main body housing; a developing cartridge attachable to and detachable from the main body housing; a drum cartridge attachable to and detachable from the main body housing; and a developing guide for guiding attachment and detachment of the developing cartridge to and from the main body housing. The developing cartridge includes a developing roller and a developing memory for storing information. The drum cartridge includes a photosensitive drum. The developing guide is movable together with the developing cartridge between a first position where the developing roller is in contact with the photosensitive drum and a second position where the (Continued)

developing roller is separated from the photosensitive drum. The developing guide includes a developing memory terminal configured to be in contact with the developing memory in a state where the developing cartridge is attached to the main body housing.

20 Claims, 11 Drawing Sheets

Related U.S. Application Data continuation of application No. 17/484,603, filed on Sep. 24, 2021, now Pat. No. 11,914,323, which is a continuation of application No. PCT/JP2019/022713, filed on Jun. 7, 2019.

(56) References Cited

U.S. PATENT DOCUMENTS

| | | | | |
|---|---|---|---|---|
| 2008/0240776 | A1 | 10/2008 | Ishikawa | |
| 2008/0240778 | A1 | 10/2008 | Ishikawa et al. | |
| 2014/0112679 | A1 | 4/2014 | Choi | |
| 2014/0169824 | A1* | 6/2014 | Seto | G03G 21/1652 399/90 |
| 2014/0294425 | A1 | 10/2014 | Okabe | |
| 2015/0043937 | A1 | 2/2015 | Choi et al. | |
| 2017/0185032 | A1 | 6/2017 | Itabashi et al. | |
| 2017/0227926 | A1 | 8/2017 | Shimizu et al. | |
| 2017/0261921 | A1 | 9/2017 | Kawamura et al. | |
| 2018/0129161 | A1 | 5/2018 | Kim | |
| 2018/0181055 | A1 | 6/2018 | Itabashi | |
| 2018/0314202 | A1 | 11/2018 | Yokoi | |
| 2019/0079425 | A1* | 3/2019 | Lin | G03G 21/1652 |
| 2022/0011719 | A1 | 1/2022 | Fukamachi et al. | |

FOREIGN PATENT DOCUMENTS

| | | | |
|---|---|---|---|
| JP | 2006-065267 | A | 3/2006 |
| JP | 2008-242142 | A | 10/2008 |
| JP | 2008-242267 | A | 10/2008 |
| JP | 2009-157389 | A | 7/2009 |
| JP | 2010-072395 | A | 4/2010 |
| JP | 2010-085797 | A | 4/2010 |
| JP | 2013-246372 | A | 12/2013 |
| JP | 2014-119505 | A | 6/2014 |
| JP | 2014-521125 | A | 8/2014 |
| JP | 2014-199334 | A | 10/2014 |
| JP | 2015-082056 | A | 4/2015 |
| JP | 2016-133760 | A | 7/2016 |
| JP | 2017-044845 | A | 3/2017 |
| JP | 2017-142490 | A | 8/2017 |
| JP | 2017-167522 | A | 9/2017 |
| JP | 2018-106050 | A | 7/2018 |
| JP | 2020-160280 | A | 10/2020 |
| KR | 10-2014-52522 | A | 5/2014 |
| WO | 2013/012255 | A | 1/2013 |

OTHER PUBLICATIONS

International Preliminary Report on Patentability and Written Opinion of the International Searching Authority issued in corresponding International Patent Application No. PCT/JP2019/022713, dated Sep. 28, 2021.

Office Action issued in corresponding Japanese patent application 2019-059870, Dec. 6, 2022.

Office Action issued in corresponding Japanese Patent Application No. 2023-175676, Jul. 23, 2024.

* cited by examiner

IMAGE FORMING APPARATUS INCLUDING DEVELOPING GUIDE FOR GUIDING ATTACHMENT AND DETACHMENT OF DEVELOPING CARTRIDGE TO AND FROM MAIN BODY HOUSING

REFERENCE TO RELATED APPLICATIONS

This application is a continuation of U.S. patent application Ser. No. 18/359,400 filed Jul. 26, 2023, now U.S. Pat. No. 12,092,991, which is a continuation of U.S. patent application Ser. No. 17/484,603 filed Sep. 24, 2021, now U.S. Pat. No. 11,914,323, which is a by-pass continuation application of International Application No. PCT/JP2019/022713 filed Jun. 7, 2019 claiming priority from Japanese Patent Application No. 2019-059870 filed Mar. 27, 2019. The entire contents of the above-mentioned applications are incorporated herein by reference.

BACKGROUND ART

Technical Field

The present disclosure relates to an image forming apparatus including an attachable developing cartridge having a developing memory.

Background

According to a conventional image forming apparatus in which a developing cartridge (developing unit) is attachable to a body housing in the axial direction of a developing roller, the developing roller can be brought into contact with and separated from a photosensitive drum by moving the developing cartridge in the upward direction and in the downward direction.

DESCRIPTION

Summary

However, in a case where a memory configured to store information is provided at an outer surface of the developing cartridge of the conventional image forming apparatus, an electrical contact surface of the memory may be worn away due to frictional contact with a developing memory terminal provided at the body housing as a result of movement of the developing cartridge for making the developing roller come into contact with or separate from the photosensitive drum.

In view of the foregoing, it is an object of the present disclosure to avoid frictional contact between the memory of the developing cartridge and the developing memory terminal of the body housing.

In order to attain the above and other objects, according to one aspect, the present disclosure provides an image forming apparatus including a main body housing, a cover, a developing cartridge, a drum cartridge, and a developing guide. The main body housing has an opening. The cover is configured to open and close the opening. The developing cartridge is attachable to and detachable from the main body housing in an axial direction through the opening. The developing cartridge includes a developing roller and a developing memory. The developing roller is rotatable about a first axis extending in the axial direction. The developing memory is configured to store information therein. The drum cartridge is attachable to and detachable from the main body housing in the axial direction through the opening. The drum cartridge is configured to be arrayed with the developing cartridge in an orthogonal direction orthogonal to the axial direction. The drum cartridge includes a photosensitive drum rotatable about a second axis extending in the axial direction. The developing guide is configured to guide attachment and detachment of the developing cartridge to and from the main body housing. The developing guide is movable together with the developing cartridge between a first position where the developing roller is in contact with the photosensitive drum and a second position where the developing roller is separated from the photosensitive drum. The developing guide includes a developing memory terminal configured to be in contact with the developing memory in a state where the developing cartridge is attached to the main body housing.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Hereinafter, one embodiment of the present disclosure will be described while referring to the accompanying drawings.

Figure 1:
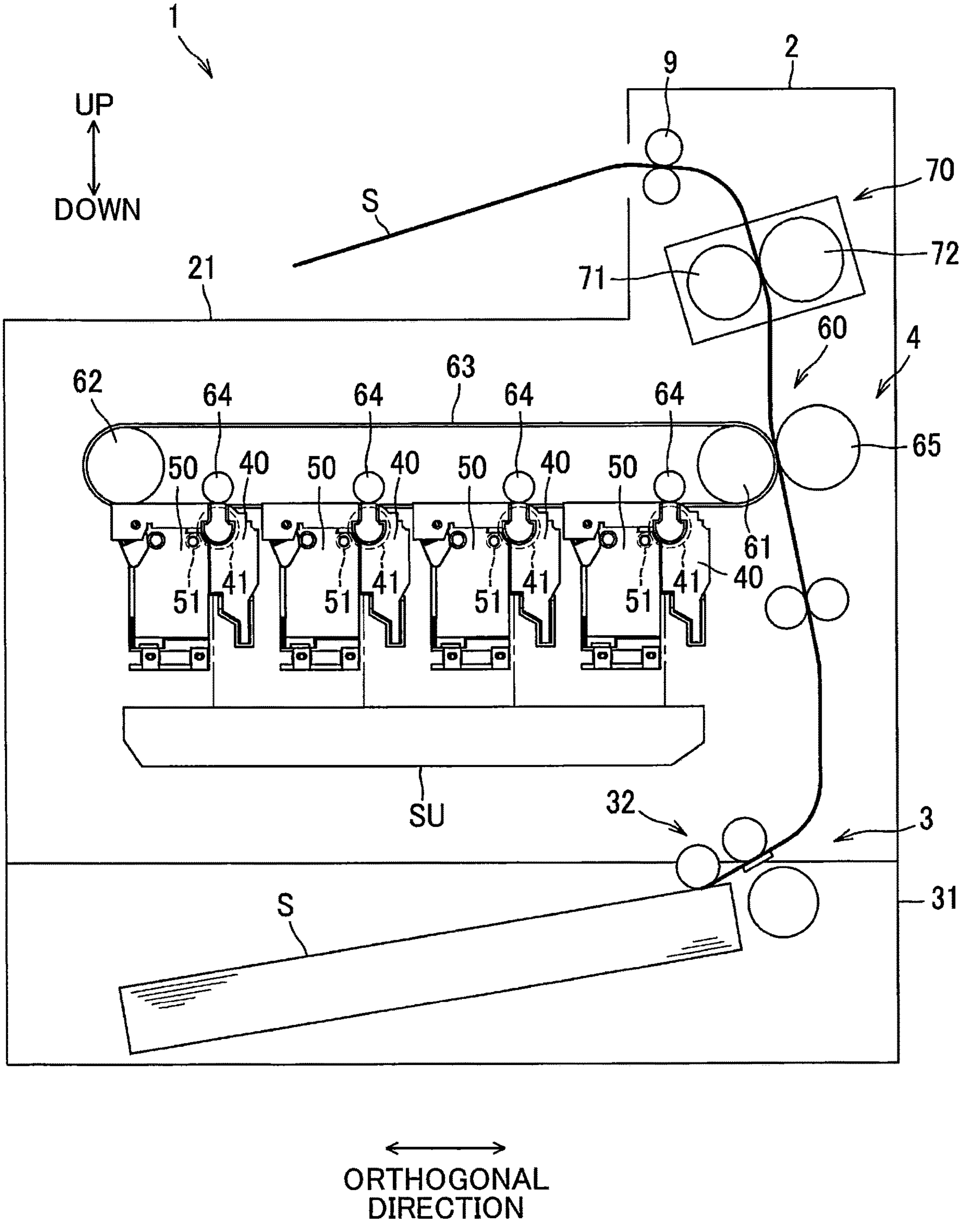
FIG. 1 is a cross-sectional view illustrating the structure of an image forming apparatus according to one embodiment of the present disclosure.

As illustrated in FIG. 1, an image forming apparatus 1 includes a main body housing 2, a sheet supply unit 3, an image forming portion 4, and a discharge tray 21. The image forming apparatus 1 is a color printer. The sheet supply unit 3 is configured to supply a sheet S to the image forming portion 4. The image forming portion 4 is configured to form an image on the sheet S.

The sheet supply unit 3 is positioned at a lower internal portion of the main body housing 2. The sheet supply unit 3 includes a sheet supply tray 31, and a sheet supply mechanism 32. The sheet supply tray 31 is attachable to and detachable from the main body housing 2. The sheet supply mechanism 32 is configured to convey the sheet S from the sheet supply tray 31 to the image forming portion 4.

The image forming portion 4 includes four drum cartridges 40, four developing cartridges 50, an exposure unit SU, a transfer unit 60, and a fixing unit 70. The four drum cartridges 40 and the four developing cartridges 50 are alternately arrayed. The four drum cartridges 40 and the four developing cartridges 50 correspond to the different colors of yellow, magenta, cyan, and black. Each drum cartridge 40 includes a photosensitive drum 41. Each developing cartridge 50 includes a developing roller 51.

The exposure unit SU is positioned below the drum cartridges 40. The exposure unit SU is configured to emit laser beam to each of the photosensitive drums 41 of the drum cartridges 40.

The transfer unit 60 is positioned between the four photosensitive drums 41 and the discharge tray 21. The transfer unit 60 includes a drive roller 61, a follower roller 62, an intermediate transfer belt 63, four primary transfer rollers 64, and a secondary transfer roller 65.

The intermediate transfer belt 63 is an endless belt. In a state where the drum cartridges 40 and the developing cartridges 50 are attached to the main body housing 2, the intermediate transfer belt 63 is positioned above the drum cartridges 40 and the developing cartridges 50.

The primary transfer rollers 64 are positioned inside the loop of the intermediate transfer belt 63. The intermediate transfer belt 63 is nipped between each primary transfer roller 64 and each photosensitive drum 41.

The secondary transfer roller 65 is positioned outside the loop of the intermediate transfer belt 63. The intermediate transfer belt 63 is nipped between the secondary transfer roller 65 and the drive roller 61.

The fixing unit 70 is positioned above the intermediate transfer belt 63. The fixing unit 70 includes a heat roller 71 and a pressure roller 72. The heat roller 71 and the pressure roller 72 are in pressure contact with each other.

For forming an image in the image forming apparatus 1, firstly, a charger charges a surface of the photosensitive drum 41. Then, the exposure unit SU exposes the surface of the photosensitive drum 41 to light. Hence, an electrostatic latent image is formed on the photosensitive drum 41.

Then, the developing roller 51 supplies developing agent to the electrostatic latent image formed on the photosensitive drum 41. Hence, a developing agent image is formed on the photosensitive drum 41. Then, the developing agent image on the photosensitive drum 41 is transferred onto the intermediate transfer belt 63.

The developing agent image on the intermediate transfer belt 63 is transferred onto the sheet S when the sheet S moves through a portion between the intermediate transfer belt 63 and the secondary transfer roller 65. Then, the developing agent image on the sheet S is fixed to the sheet S by the fixing unit 70. Then, the sheet S is discharged onto the discharge tray 21 by a discharge roller 9.

Figure 2:
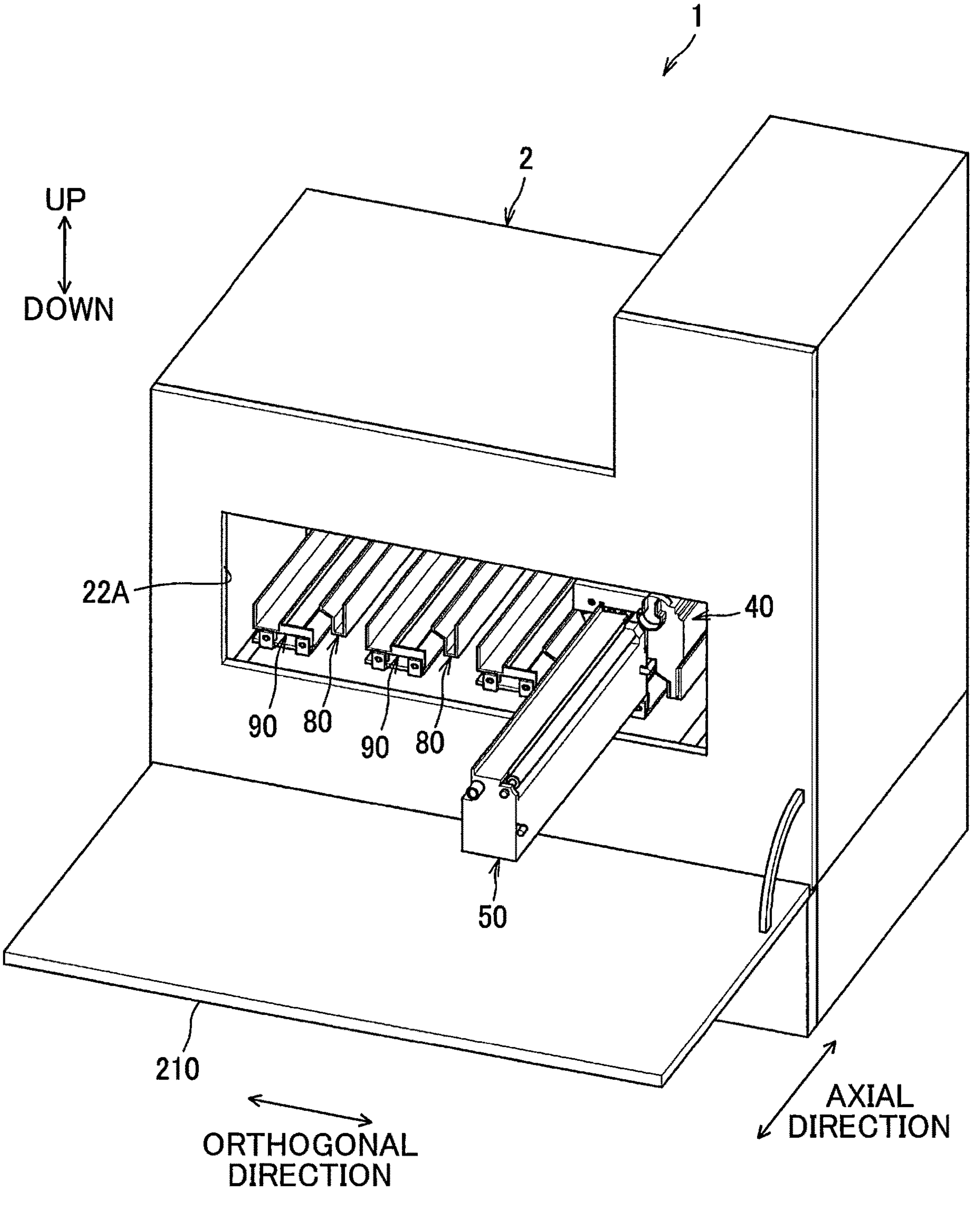
FIG. 2 is a perspective view of the image forming apparatus in a state where a cover of the image forming apparatus is at an open position.

As illustrated in FIG. 2, the main body housing 2 has an opening 22A. The main body housing 2 includes a cover 210 configured to open and close the opening 22A. The opening 22A is an opening through which attachment and detachment of the drum cartridges 40 and the developing cartridges 50 are performed. The opening 22A allows the drum cartridges 40 and the developing cartridges 50 to pass through the opening 22A.

Figure 3A:
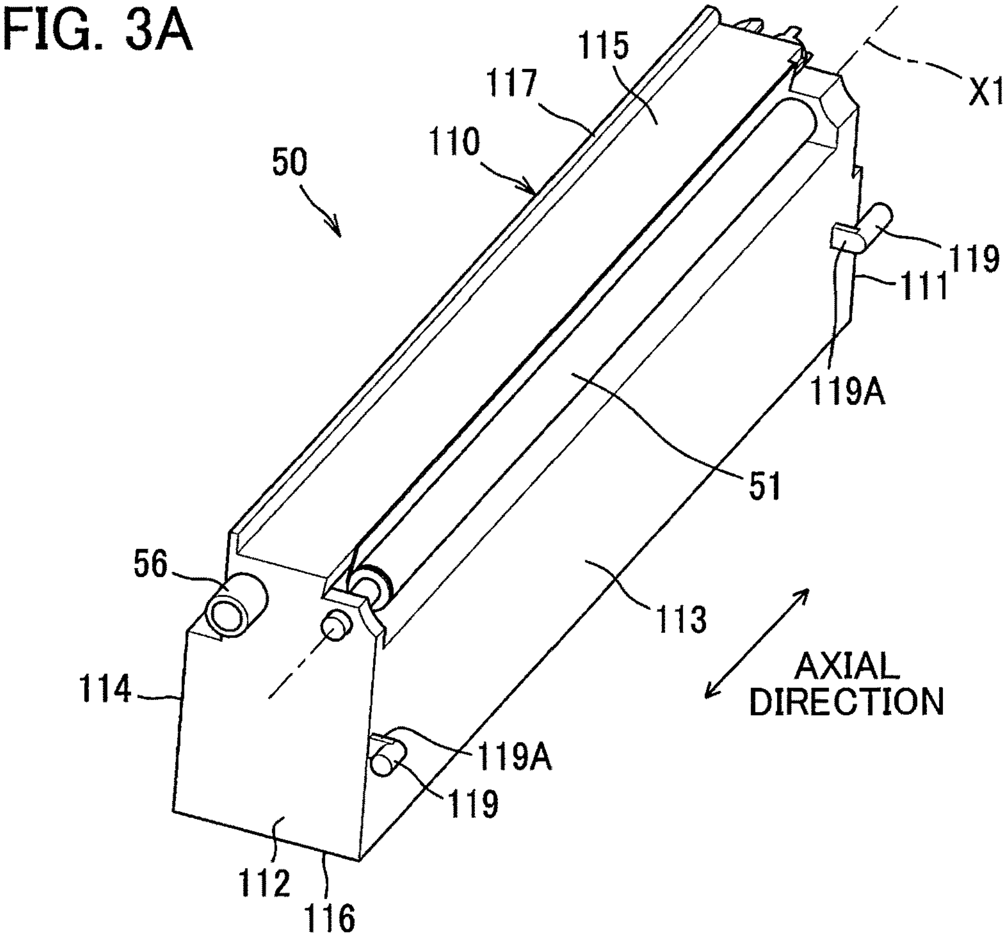
FIG. 3A is a perspective view of a developing cartridge of the image forming apparatus, and particularly illustrates a second outer surface of the developing cartridge.
Figure 3B:
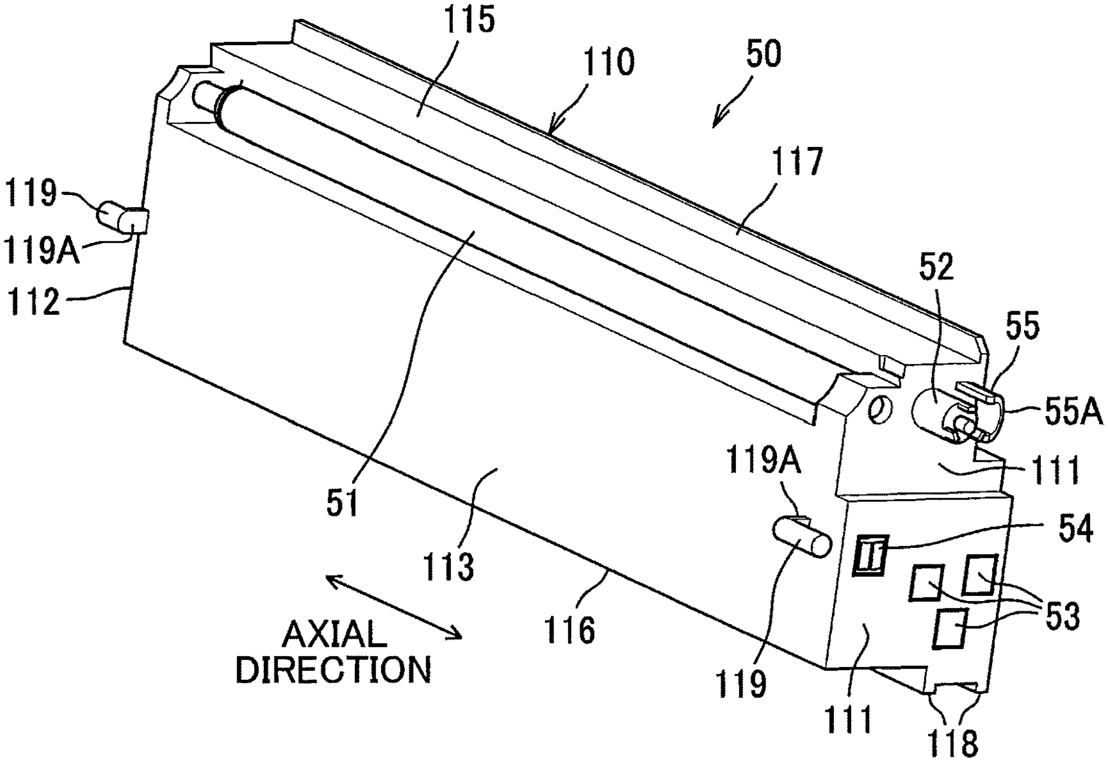
FIG. 3B is another perspective view of the developing cartridge, and particularly illustrates a first outer surface of the developing cartridge.

As illustrated in FIGS. 3A and 3B, each developing cartridge 50 includes a developing frame 110, the developing roller 51, a coupling 52, developing electrodes 53, and a developing memory 54. The developing cartridge 50 is attachable to and detachable from the main body housing 2 in the axial direction of the developing roller 51 (hereinafter simply referred to as "axial direction") through the opening 22A (see FIG. 2).

The developing frame 110 is configured to accommodate therein developing agent. The developing agent is toner, for example. The developing roller 51 is rotatable about a first axis X1 extending in the axial direction. The developing frame 110 rotatably supports the developing roller 51. The coupling 52 is configured to receive driving force for rotating the developing roller 51. The developing electrodes 53 are electrodes electrically connected to the developing roller 51. The developing memory 54 is a storage medium capable of storing therein information related to the developing cartridge 50, such as the usage amount of developing agent in the developing cartridge 50 and the identification number of the developing cartridge 50.

The developing frame 110 has a first outer surface 111 and a second outer surface 112 positioned apart from the first outer surface 111 in the axial direction. In a state where the developing cartridge 50 is attached to the main body housing 2, the second outer surface 112 is positioned closer to the opening 22A than the first outer surface 111 is to the opening 22A. The coupling 52, the developing electrodes 53, and the developing memory 54 are positioned at the first outer surface 111.

A pressure portion 55 protruding in the axial direction is positioned at an upper portion of the first outer surface 111. The pressure portion 55 extends in an arcuate shape as viewed in the axial direction. The pressure portion 55 is at a position overlapping the developing roller 51 in the up-down direction. The pressure portion 55 is positioned at an end portion of the developing cartridge 50 in a direction that is orthogonal to the axial direction and also the direction in which the drum cartridge 40 and the developing cartridge 50 are arrayed (hereinafter simply referred to as "orthogonal direction"), the end portion being far from the developing roller 51. The pressure portion 55 has an end portion in the axial direction. The end portion of the pressure portion has a sloped surface 55A. The sloped surface 55A is inclined so as to be closer to the developing roller 51 as approaching the tip end in the axial direction of the sloped surface 55A. (also see FIG. 9B).

A pressure portion 56 protruding in the axial direction is positioned at an upper portion of the second outer surface 112. The pressure portion 56 has a cylindrical shape having a circular shape as viewed in the axial direction. The pressure portion 56 is at a position overlapping the developing roller 51 in the up-down direction. The pressure portion 56 is positioned at an end portion of the developing cartridge 50 in the orthogonal direction, the end portion being far from the developing roller 51.

The developing frame 110 further has a third outer surface 113 and a fourth outer surface 114 positioned apart from the third outer surface 113 in the orthogonal direction. The third outer surface 113 and the fourth outer surface 114 extend in the axial direction, and connect the first outer surface 111 and the second outer surface 112.

The developing roller 51 is positioned at an upper end portion of the developing cartridge 50. The developing roller 51 is positioned at an end portion of the developing cartridge 50 in the orthogonal direction, the end portion being close to the third outer surface 113.

A boss 119 is positioned at each end portion in the axial direction of the third outer surface 113. Specifically, a boss support portion 119A protruding in the orthogonal direction is provided at each end portion in the axial direction of the third outer surface 113. The boss 119 is provided at an end portion in the orthogonal direction of the boss support portion 119A. Each boss 119 has a solid cylindrical shape protruding in the axial direction. The boss 119 is positioned between the upper end portion of the developing cartridge 50 and the lower end portion of the developing cartridge 50 in the up-down direction.

The developing frame 110 further has a fifth outer surface 115 and a sixth outer surface 116 positioned downward of and apart from the fifth outer surface 115. The fifth outer surface 115 and the sixth outer surface 116 extend in the axial direction and connect the first outer surface 111 and the second outer surface 112.

The developing frame 110 further includes a first protrusion 117. The first protrusion 117 is positioned at the upper end portion of the developing cartridge 50. Specifically, the first protrusion 117 protrudes upward from the fifth outer surface 115, and is elongated in the axial direction. The developing frame 110 further includes two second protrusions 118. The second protrusions 118 are positioned at the lower end portion of the developing cartridge 50. The second protrusions 118 are configured to be guided by a rail groove 91A described later. The second protrusions 118 are elongated in the axial direction. In each developing frame 110, the two second protrusions 118 are arrayed in the orthogonal direction.

Figure 4A:
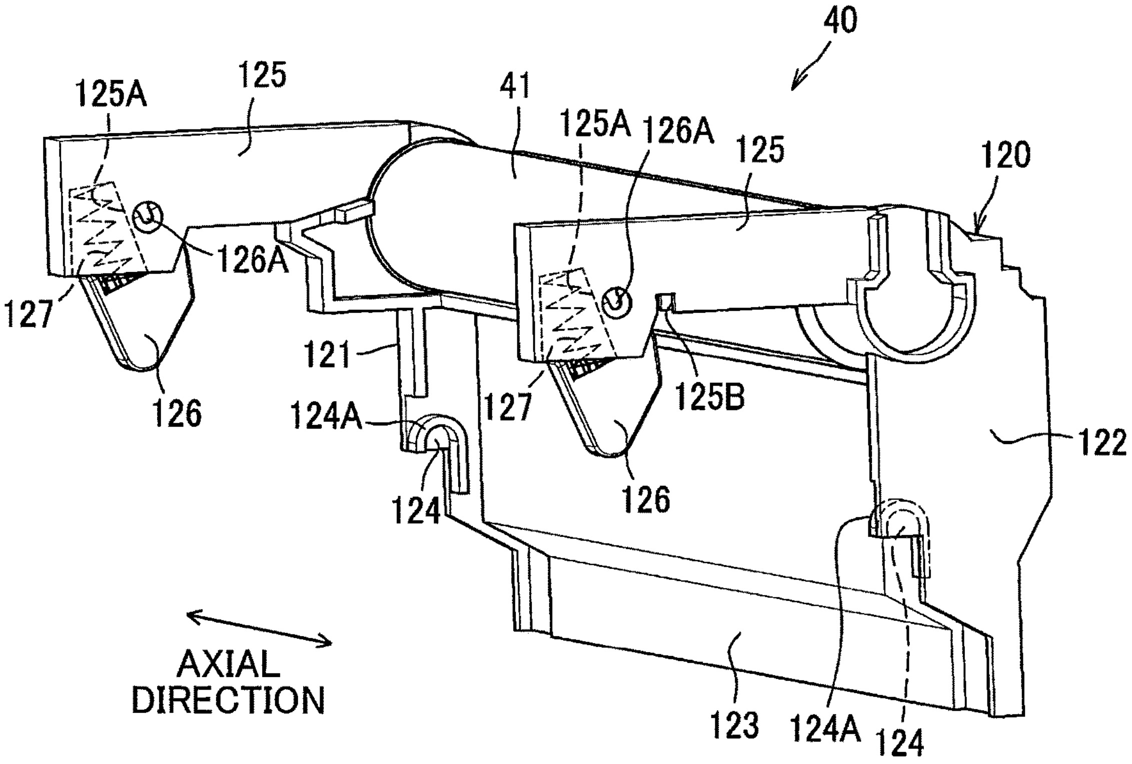
FIG. 4A is a perspective view of a drum cartridge of the image forming apparatus, and particularly illustrates a second side wall of the developing drum.
Figure 4B:
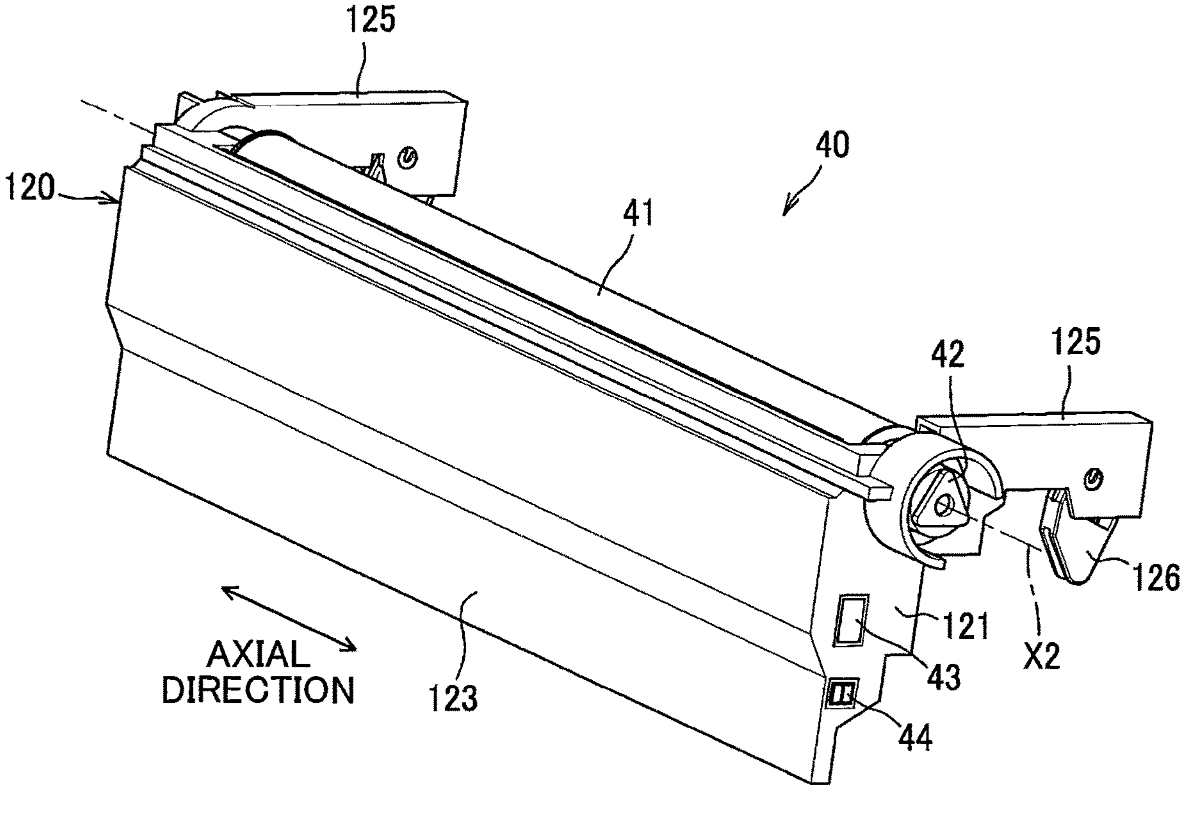
FIG. 4B is another perspective view of the drum cartridge, and particularly illustrates a first side wall of the developing drum.

As illustrated in FIGS. 4A and 4B, each drum cartridge 40 includes a drum frame 120, the charger (not illustrated), the photosensitive drum 41, a coupling 42, a drum electrode 43, and a drum memory 44. The photosensitive drum 41 is rotatable about a second axis X2 extending in the axial direction. The drum frame 120 rotatably supports the photosensitive drum 41. The drum cartridge 40 is attachable to and detachable from the main body housing 2 in the axial direction of the photosensitive drum 41 through the opening 22A (see FIG. 2).

The coupling 42 is configured to receive driving force for rotating the photosensitive drum 41. The drum electrode 43 is an electrode electrically connected to the charger. The drum memory 44 is a storage medium capable of storing therein information related to the drum cartridge 40, such as the usage time of the drum cartridge 40 and the identification number of the drum cartridge 40.

The drum frame 120 includes a first side wall 121 and a second side wall 122 positioned apart from the first side wall 121 in the axial direction. In a state where the drum cartridge 40 is attached to the main body housing 2, the second side wall 122 is positioned closer to the opening 22A than the first side wall 121 is to the opening 22A. The coupling 42, the drum electrode 43, and the drum memory 44 are positioned at the first side wall 121. The drum frame 120 further includes a third protrusion 123, a pair of arms 125, pressing members 126, and springs 127. The pressing member 126 and the spring 127 are provided at each arm 125.

The photosensitive drum 41 is positioned at the upper end portion of the drum cartridge 40.

The first side wall 121 has a surface facing the second side wall 122, and a protrusion 124A positioned at the surface facing the second side wall 122. The protrusion 124A extends in a U-shape opening downward. By virtue of the protrusion 124A, the drum cartridge 40 has a recessed portion 124 opening downward. Similarly, the second side wall 122 has a surface facing the first side wall 121, and a protrusion 124A positioned at the surface facing the first side wall 121. The protrusion 124A extends in a U-shape opening downward. By virtue of the protrusion 124A, the drum cartridge 40 has a recessed portion 124 opening downward. Each recessed portion 124 is positioned between the upper end portion of the drum cartridge 40 and the lower end portion of the drum cartridge 40 in the up-down direction. Each recessed portion 124 permits the boss 119 of the developing cartridge 50 to be received in the recessed portion 124. Since each recessed portion 124 opens downward, the recessed portion 124 receives the corresponding boss 119 from below. Each recessed portion 124 pivotally movably supports the developing cartridge 50 by receiving the corresponding boss 119 in the recessed portion 124 from below. Hence, the developing cartridge 50 is pivotally movable about the bosses 119 in a state where the bosses 119 are received in the corresponding recessed portions 124.

The third protrusion 123 is positioned at the lower end portion of the drum frame 120. The third protrusion 123 protrudes downward and is elongated in the axial direction.

The pair of arms 125 have the same structure, except that only one of the arms 125 has a guide recess 125B. The arms 125 are positioned at the upper end portion of the drum cartridge 40. The arm 125 extends in the orthogonal direction from each end portion in the axial direction of the upper end portion of the drum frame 120. Each arm 125 has a spring accommodating portion 125A Further, the closer of the two arms 125 to the second side wall 122 has the guide recess 125B.

The spring accommodating portion 125A accommodates therein the spring 127. The spring 127 is a compression spring. The guide recess 125B is positioned at the lower edge portion of the arm 125. The guide recess 125B is recessed upward. The guide recess 125B is configured to receive the first protrusion 117 of the developing cartridge 50 to guide attachment and detachment of the developing cartridge 50.

The pressing member 126 is positioned at an end portion of the arm 125, the end portion being far from the photosensitive drum 41. The pressing member 126 extends downward from the end portion of the arm 125. The pressing member 126 includes a shaft portion 126A. The shaft portion 126A is rotatably supported by the arm 125. The pressing member 126 is urged toward the photosensitive drum 41 in the orthogonal direction by the spring 127. The pressing members 126 are configured to abut on the corresponding pressure portions 55 and 56 of the developing cartridge 50 to press the developing roller 51 against the photosensitive drum 41.

Figure 5:
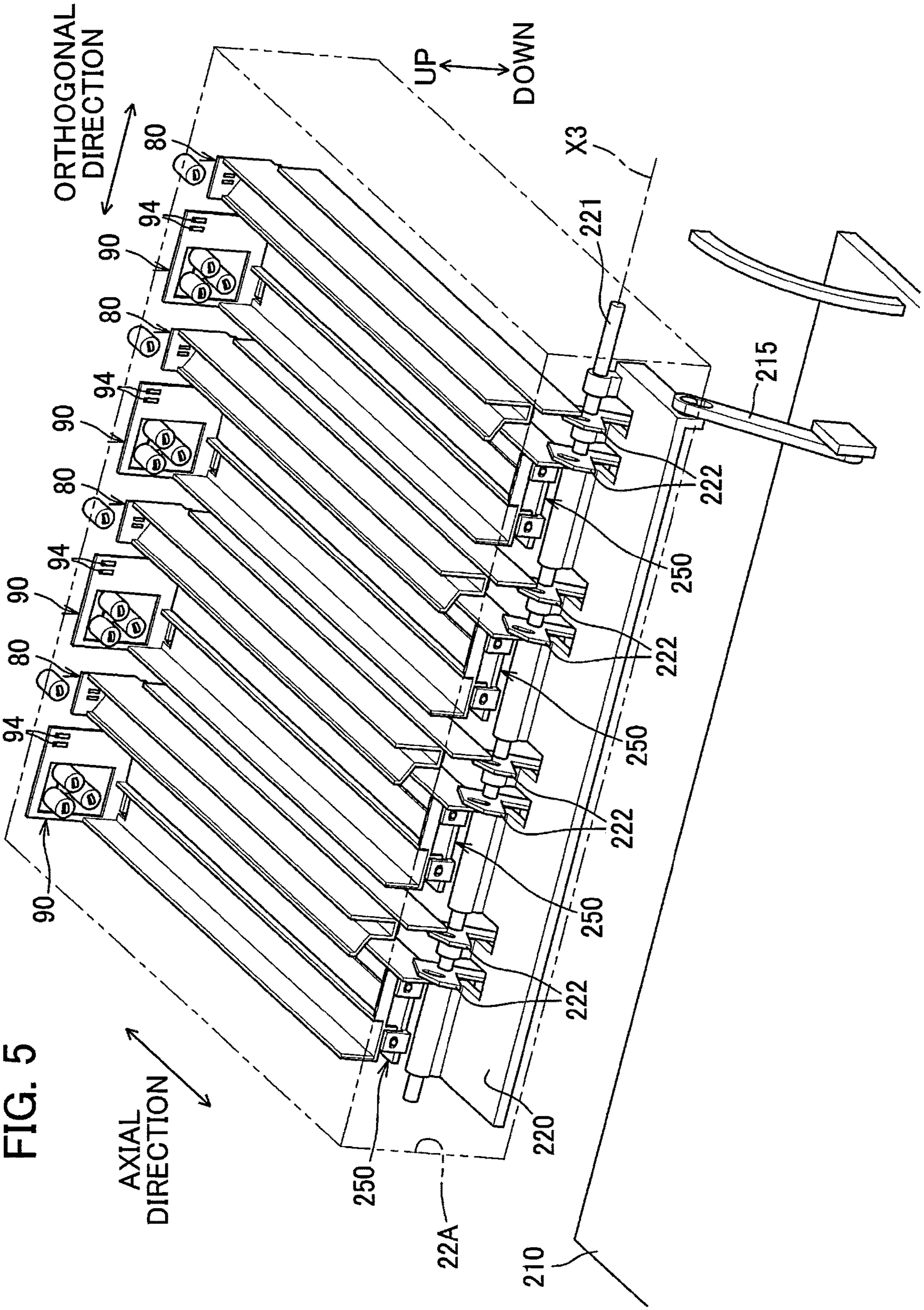
FIG. 5 is a perspective view of the internal structure of the image forming apparatus in a state where the cover is at the open position.

As illustrated in FIG. 5, the image forming apparatus 1 includes four drum guides 80 and four developing guides 90. Specifically, the drum guides 80 and the developing guides 90 are provided in the main body housing 2. The four drum guides 80 and four developing guides 90 alternately arrayed in the orthogonal direction. Each developing guide 90 is movable together with the developing cartridge 50 between a first position (see FIG. 11) where the developing roller 51 is in contact with the photosensitive drum 41 and a second position (see FIG. 10) where the developing roller 51 is separated from the photosensitive drum 41. Further, each drum guide 80 is movable together with the drum cartridge 40 between a third position (see FIG. 11) where the photosensitive drum 41 is in contact with the intermediate transfer belt 63 and a fourth position (see FIG. 10) where the photosensitive drum 41 is separated from the intermediate transfer belt 63.

The drum guide 80 and the developing guide 90 are configured to move in the upward direction and in the downward direction according to opening and closing of the cover 210. Specifically, the cover 210 is movable between an open position (see FIGS. 5, 7A, and 10) where the cover 210 opens the opening 22A and a closed position (see FIGS. 7B and 11) where the cover 210 closes the opening 22A. In accordance with movement of the cover 210 from the open position to the closed position, the developing guide 90 moves from the second position to the first position and the drum guide 80 moves from the fourth position to the third position. Hence, the developing roller 51 can be brought into contact with the photosensitive drum 41 by moving the cover 210 from the open position to the closed position. For attaining the above operation, the image forming apparatus 1 includes an inner cover 220, a link 215, a shaft 221, levers 222, and tables 250.

The inner cover 220 is pivotally movably supported by the shaft 221. The shaft 221 is fixed to the main body housing 2. Hence, the inner cover 220 is pivotally movable about a third axis X3.

The link 215 has one end portion pivotally movably connected to the cover 210, and the other end portion pivotally movably connected to the inner cover 220. Hence, when the cover 210 is moved from the open position illustrated in FIG. 5 to the closed position, the link 215 pushes up the inner cover 220 to move the inner cover 220 from an open position (see FIG. 7A) to a closed position (see FIG. 7B).

Each lever 222 is pivotally movably supported by the shaft 221. The lever 222 is configured to pivotally move by being pushed up by the inner cover 220 when the inner cover 220 moves from the open position to the closed position. A detailed structure of the lever 222 is omitted in the drawings.

Figure 6:
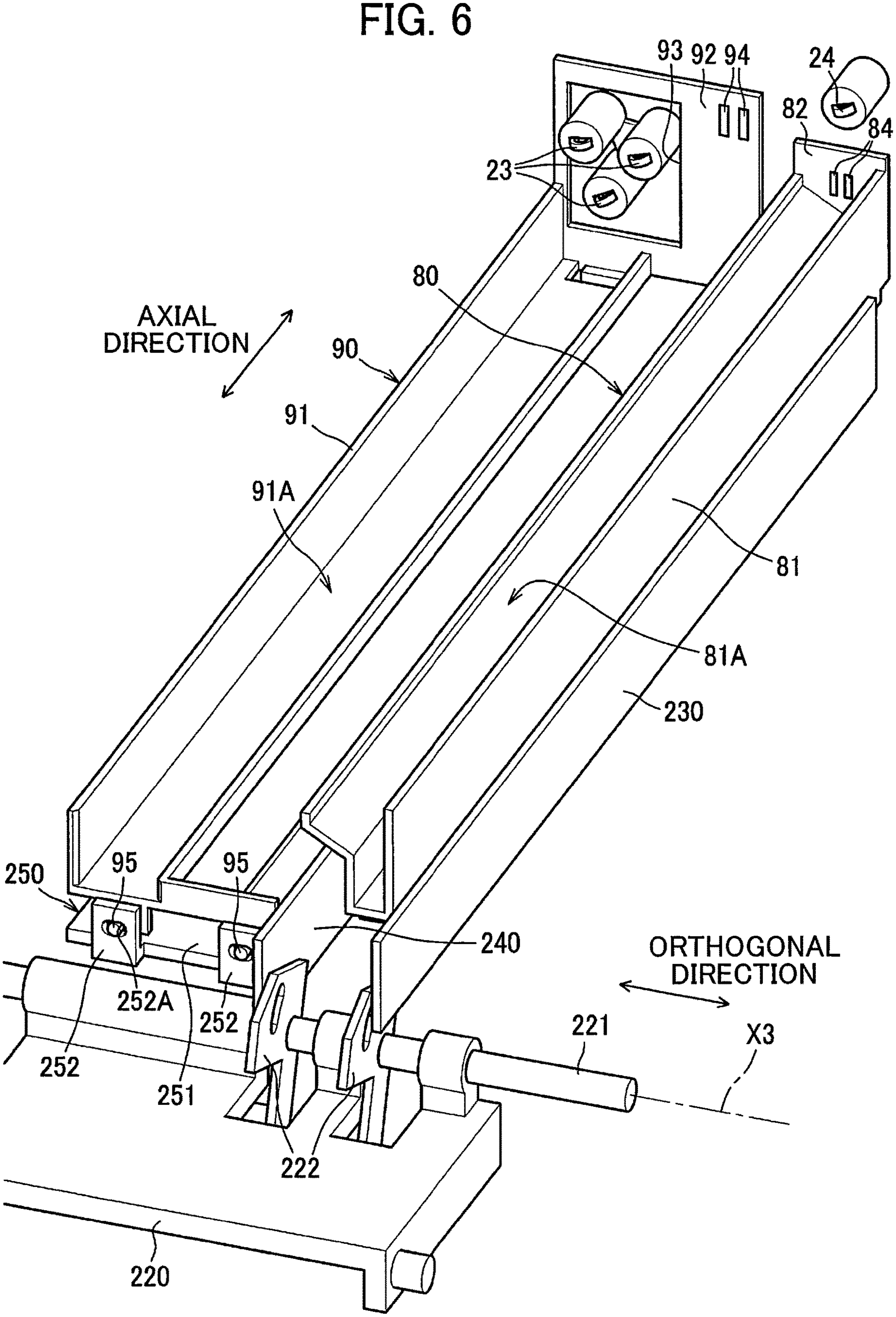
FIG. 6 is a partially enlarged view of FIG. 5.

As illustrated in FIG. 6, each drum guide 80 includes a rail 81, a support wall 82, and drum memory terminals 84. The rail 81 is configured to guide attachment and detachment of the drum cartridge 40 to and from the main body housing 2. The rail 81 supports the drum cartridge 40 from below. The rail 81 has a rail groove 81A extending in the axial direction. The rail groove 81A has a shape corresponding to the shape of the third protrusion 123 positioned at the lower end of the drum cartridge 40.

The support wall 82 is positioned at an end portion of the rail 81 in the axial direction, the end portion being far from the opening 22A. The support wall 82 is a wall crossing the axial direction. Preferably, the support wall 82 is orthogonal to the axial direction. The support wall 82 supports the drum memory terminals 84. The drum memory terminals 84 are in contact with the drum memory 44 in a state where the drum cartridge 40 is attached to the main body housing 2. Incidentally, the main body housing 2 includes a drum terminal 24. Specifically, the drum terminal 24 is provided at the main body housing 2 and above the support wall 82. The drum terminal 24 contacts the drum electrode 43 in a state where the drum cartridge 40 is attached to the main body housing 2.

Each developing guide 90 is configured to guide attachment and detachment of the developing cartridge 50 to and from the main body housing 2. The developing guide 90 includes a rail 91, a support wall 92, bosses 95, and developing memory terminals 94. The rail 91 is elongated in the axial direction. The rail 91 supports the developing cartridge 50 from below. The rail 91 has the rail groove 91A extending in the axial direction. The rail groove 91A has a width and depth suitable for receiving the second protrusions 118 positioned at the lower end of the developing cartridge 50. Hence, the second protrusions 118 can be fitted in the rail groove 91A, and accordingly, attachment and detachment of the developing cartridge can be guided.

The support wall 92 extends upward from an end portion in the axial direction of the rail 91, the end portion being far from the opening 22A. The support wall 92 faces the first outer surface 111 of the developing cartridge 50 attached to the main body housing 2. The support wall 92 supports the developing memory terminals 94. The developing memory terminals 94 are in contact with the developing memory 54 in a state where the developing cartridge 50 is attached to the main body housing 2.

A pair of bosses 95 is provided at each end portion in the axial direction of the lower portion of the rail 91 (in FIG. 6, only one pair of bosses 95 positioned at one end portion in the axial direction is illustrated). Each boss 95 protrudes in the axial direction from the lower portion of the rail 91. One of the pair of bosses 95 and the other of the pair of bosses 95 are positioned apart from each other in the orthogonal direction.

The main body housing 2 includes developing terminals 23. Specifically, the developing terminals 23 are provided at the main body housing 2. The developing terminals 23 are in contact with the developing electrodes 53 in a state where the developing cartridge 50 is attached to the main body housing 2.

The support wall 92 has a hole 93 allowing the developing terminals 23 to pass therethrough. The hole 93 allows contact between the developing electrodes 53 and the developing terminals 23 by insertion of the developing terminals 23 through the hole 93.

Each drum guide 80 is supported by a slide plate 230 from below. The slide plate 230 is supported by the main body housing 2 so as to be slidably movable in the axial direction, although not illustrated.

Each developing guide 90 is supported by the corresponding table 250 from below. Each table 250 is supported by a slide plate 240 from below. The slide plate 240 is supported by the main body housing 2 so as to be slidably movable in the axial direction, although not illustrated.

Each table 250 includes a plate 251 and guide support walls 252. Two guide support walls 252 are provided at each end portion of the plate 251 in the axial direction (in FIG. 6, only two guide support walls 252 positioned at one end portion in the axial direction are illustrated). Each guide support wall 252 extends upward from the plate 251. Each guide support wall 252 has an elongated slot 252A extending in the orthogonal direction. The boss 95 of the developing guide 90 is fitted in the elongated slot 252A. The developing guide 90 is supported by the table 250 because of the fitting engagement between the boss 95 and the elongated slot 252A. Further, since the elongated slot 252A is elongated in the orthogonal direction, the lower end portion of the developing guide 90 and the lower end portion of the developing cartridge 50 are slightly movable in the orthogonal direction.

Figure 7A:
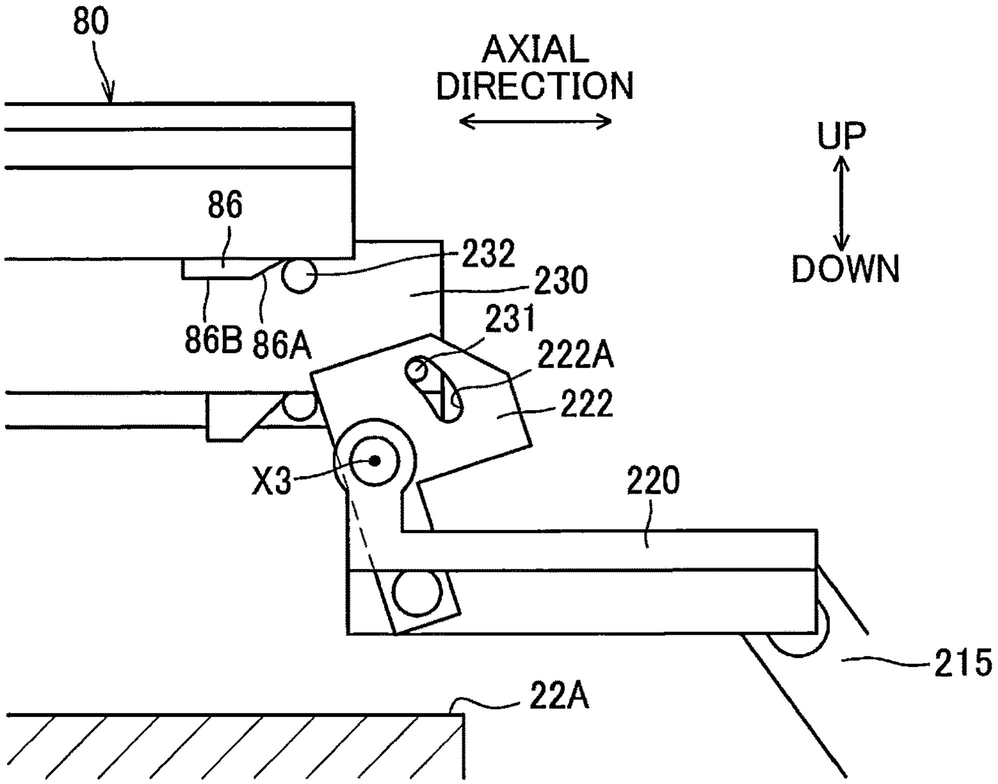
FIG. 7A is an explanatory view for describing operations in which a rail for supporting the drum cartridge of the image forming apparatus moves upward and downward in accordance with opening and closing of the cover, and particularly illustrates a state where the cover is at the open position.
Figure 7B:
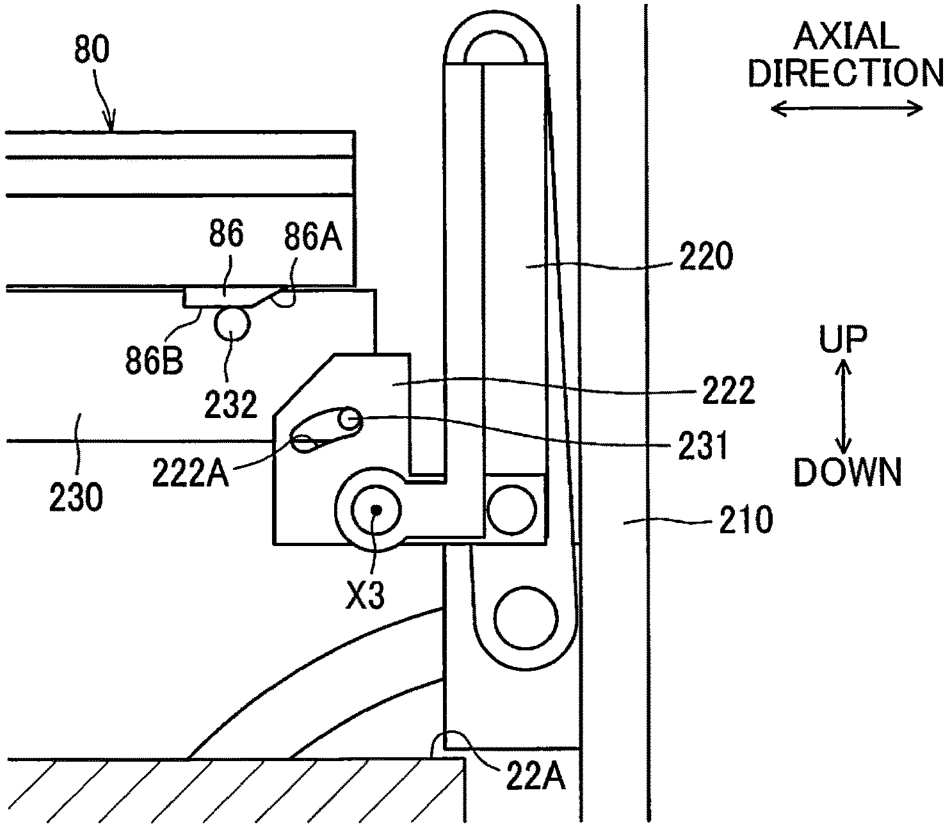
FIG. 7B is another explanatory view for describing the operations in which the rail for supporting the drum cartridge moves upward and downward in accordance with opening and closing of the cover, and particularly illustrates a state where the cover is at a closed position.

As illustrated in FIGS. 7A and 7B, each drum guide 80 has a cam portion 86 at the lower surface of the drum guide 80. The cam portion 86 has an inclined surface 86A and a support surface 86B. The inclined surface 86A is inclined relative to the axial direction. Specifically, the inclined surface 86A is inclined more downward as separating from the opening 22A. The support surface 86B is a surface extending in the axial direction. The support surface 86B is orthogonal to the up-down direction. The support surface 86B extends from an end of the inclined surface 86A in a direction away from the opening 22A. FIGS. 7A and 7B only illustrate the cam portion 86 positioned adjacent to the opening 22A. However, the drum guide 80 has another cam portion 86 at a position remote from the opening 22A and at the same height as that of the cam portion 86 illustrated in FIGS. 7A and 7B.

The slide plate 230 has a first pin 231 and a second pin 232. The first pin 231 and the second pin 232 protrude in the orthogonal direction. FIGS. 7A and 7B only illustrate the second pin 232 positioned adjacent to the opening 22A. However, the slide plate 230 has another second pin 232 at a position remote from the opening 22A and at the same height as that of the second pin 232 illustrated in FIGS. 7A and 7B.

The lever 222 has a guide slot 222A extending in an arcuate shape. The distance between the third axis X3 and one end of the guide slot 222A is different from the distance between the third axis X3 and the other end of the guide slot 222A. The first pin 231 is fitted in the guide slot 222A. Hence, the slide plate 230 is movable between a first sliding position close to the opening 22A (i.e., the position illustrated in FIG. 7A) and a second sliding position far from the opening position (i.e., the position illustrated in FIG. 7B) by pivotal movement of the lever 222 according to opening and closing of the inner cover 220.

The second pin 232 is configured to contact the cam portion 86. Specifically, in a state where the slide plate 230 is at the first sliding position, the second pin 232 is positioned away from the cam portion 86 to support the drum guide 80 at the fourth position. Further, in a case where the slide plate 230 moves from the first sliding position to the second sliding position, the second pin 232 comes into contact with the inclined surface 86A to lift up the drum guide 80 and then comes into contact with the support surface 86B to support the drum guide 80 at the third position.

Figure 8A:
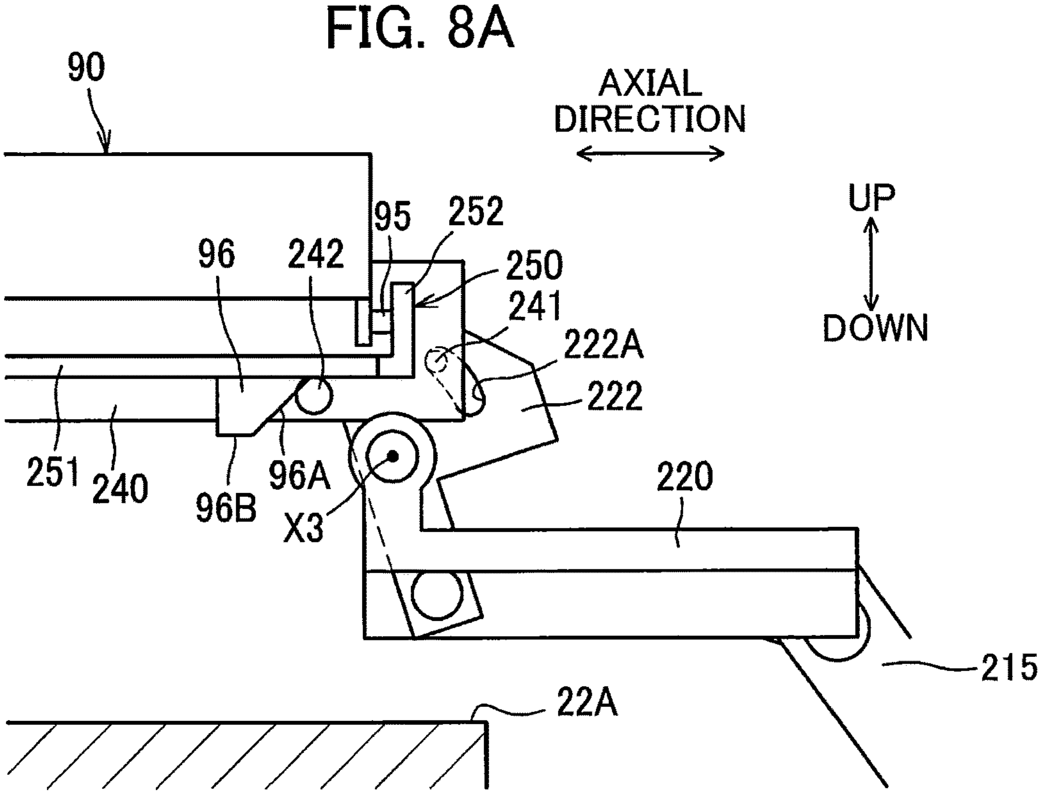
FIG. 8A is an explanatory view for describing operations in which a rail for supporting the developing cartridge moves upward and downward in accordance with opening and closing of the cover, and particularly illustrates a state where the cover is at the open position.
Figure 8B:
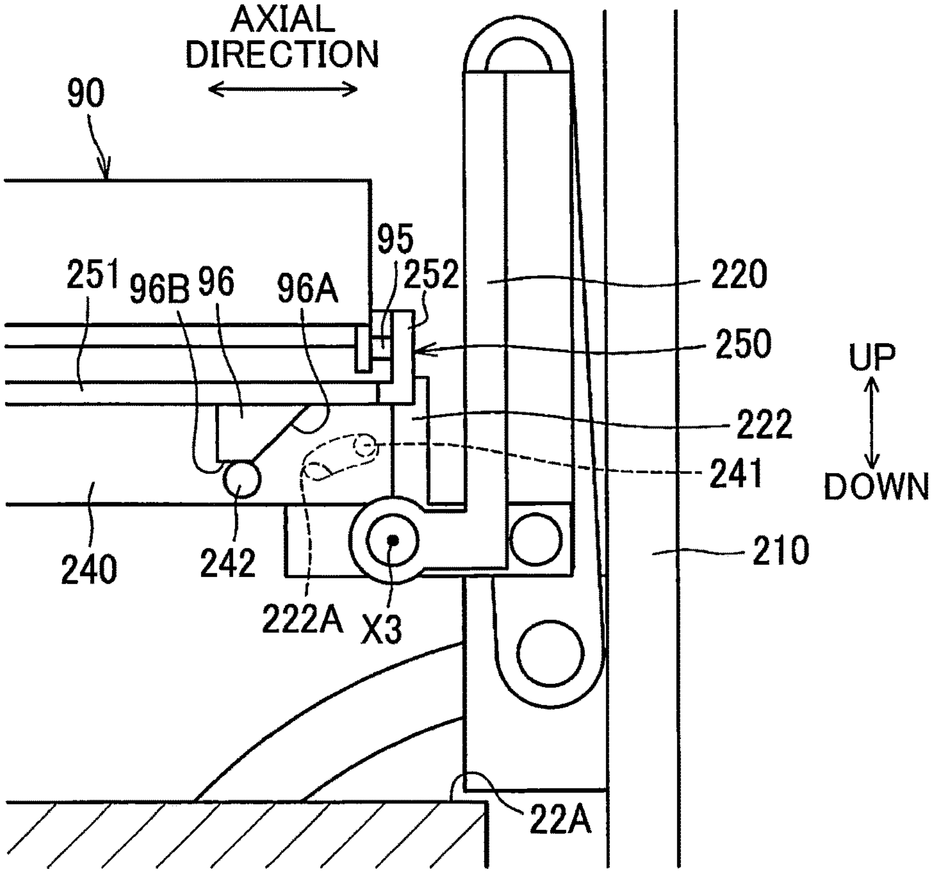
FIG. 8B is another explanatory view for describing the operations in which the rail for supporting the developing cartridge moves upward and downward in accordance with opening and closing of the cover, and particularly illustrates a state where the cover is at the closed position.

As illustrated in FIGS. 8A and 8B, each developing guide 90 has a cam potion 96 at the lower surface of the developing guide 90. The cam portion 96 has an inclined surface 96A and a support surface 96B. The inclined surface 96A is inclined relative to the axial direction. Specifically, the inclined surface 96A is inclined more downward as separating from the opening 22A. The support surface 96B is a surface extending in the axial direction. The support surface 96B is orthogonal to the up-down direction. The support surface 96B extends from an end of the inclined surface 86A in a direction away from the opening 22A. FIGS. 8A and 8B only illustrate the cam portion 96 positioned adjacent to the opening 22A. However, the developing guide 90 has another cam portion 96 at a position remote from the opening 22A and at the same height as that of the cam portion 96 illustrated in FIGS. 8A and 8B.

The slide plate 240 has a structure approximately the same as that of the slide plate 230, and thus is movable between a first sliding position and a second sliding position similarly to the slide plate 230. The slide plate 240 includes a third pin 241 and a fourth pin 242. The third pin 241 and the fourth pin 242 protrude in the orthogonal direction. FIGS. 8A and 8B only illustrate the fourth pin 242 positioned adjacent to the opening 22A. However, the slide plate 240 has another fourth pin 242 at a position remote from the opening 22A and at the same height as that of the fourth pin 242 illustrated in FIGS. 8A and 8B.

The third pin 241 is fitted in the guide slot 222A. Hence, the slide plate 240 is movable between the first sliding position close to the opening 22A (i.e., the position illustrated in FIG. 8A) and the second sliding position far from the opening 22A (i.e., the position illustrated in FIG. 8B) by pivotal movement of the lever 222 according to opening and closing of the inner cover 220.

The fourth pin 242 is configured to contact the cam portion 96. Specifically, in a state where the slide plate 240 is at the first sliding position, the fourth pin 242 is positioned away from the cam portion 96 to support the developing guide 90 at the second position. Further, in a case where the slide plate 240 moves from the first sliding position to the second sliding position, the fourth pin 242 comes into contact with the inclined surface 96A to lift up the developing guide 90 and then comes into contact with the support surface 96B to support the developing guide 90 at the first position. The dimension in the up-down direction of the cam portion 96 is greater than that of the cam portion 86. Hence, the moving amount in the up-down direction of the developing cartridge 50 in accordance with opening and closing of the cover 210 and inner cover 220 is greater than that of the drum cartridge 40.

Attachment of the drum cartridge 40 and the developing cartridge 50 and function in the image forming apparatus 1 constructed as described above will next be described. For attachment of the drum cartridge 40 and the developing cartridge 50 to the image forming apparatus 1, the cover 210 is set at the open position as illustrated in FIG. 2 to expose the opening 22A to the outside. Upon exposure of the opening 22A, the drum guide 80 and the developing guide 90 positioned in the main body housing 2 are exposed to the outside. In a state where the cover 210 is at the open position, the developing guide 90 is at the second position and the drum guide 80 is at the fourth position.

For attachment of one pair of the drum cartridge 40 and the developing cartridge 50 which correspond to the same color, the drum cartridge 40 is firstly attached to the main body housing 2, and then the developing cartridge 50 is attached to the main body housing 2.

For attachment of the drum cartridge 40 to the main body housing 2, the third protrusion 123 of the drum cartridge 40 is aligned with the rail groove 81A of the rail 81 illustrated in FIG. 6, and the drum cartridge 40 is slidingly moved along the rail 81 and inserted into the main body housing 2. As a result, the drum memory 44 of the drum cartridge 40 is brought into contact with the drum memory terminals 84. Further, the drum electrode 43 of the drum cartridge 40 is brought into contact with the drum terminal 24.

Figure 9A:
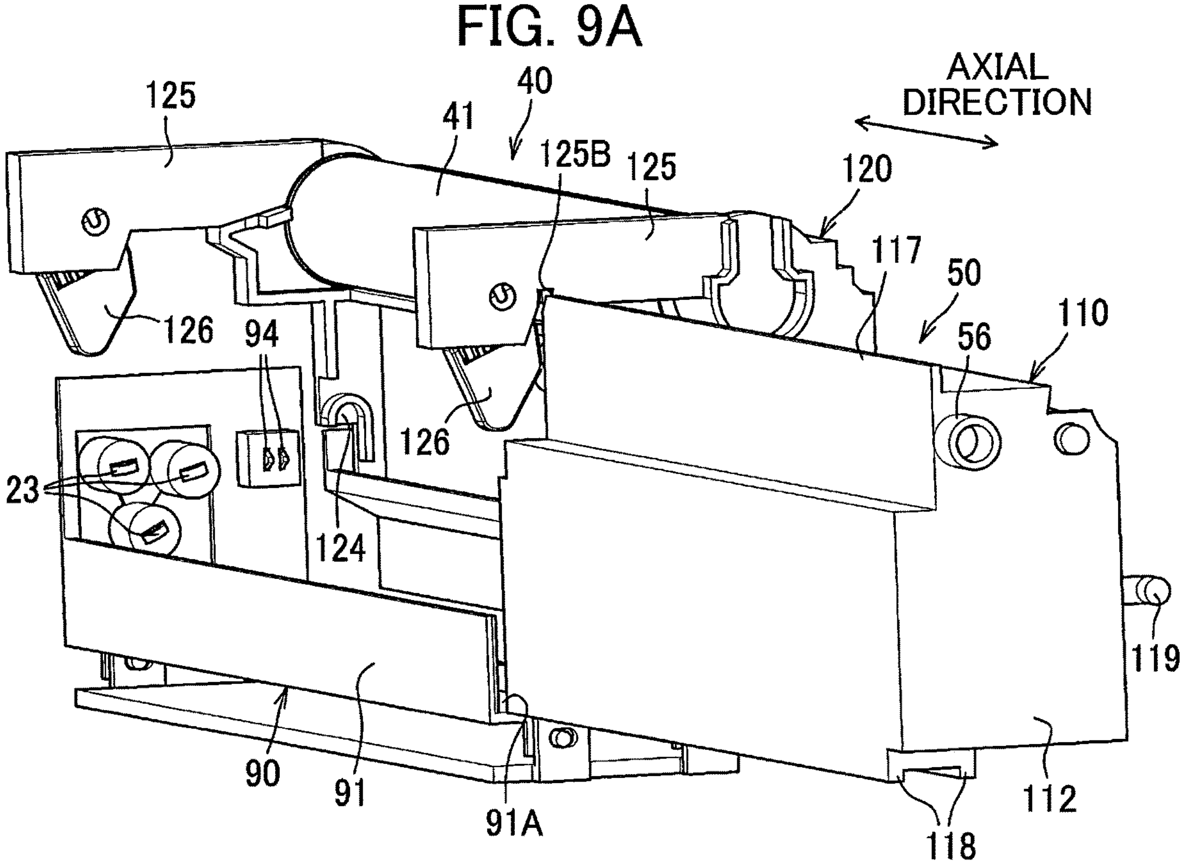
FIG. 9A is a perspective view of the developing cartridge as viewed from the side at which the opening is positioned, and describes an operation in which the developing cartridge is attached after the drum cartridge is attached.
Figure 9B:
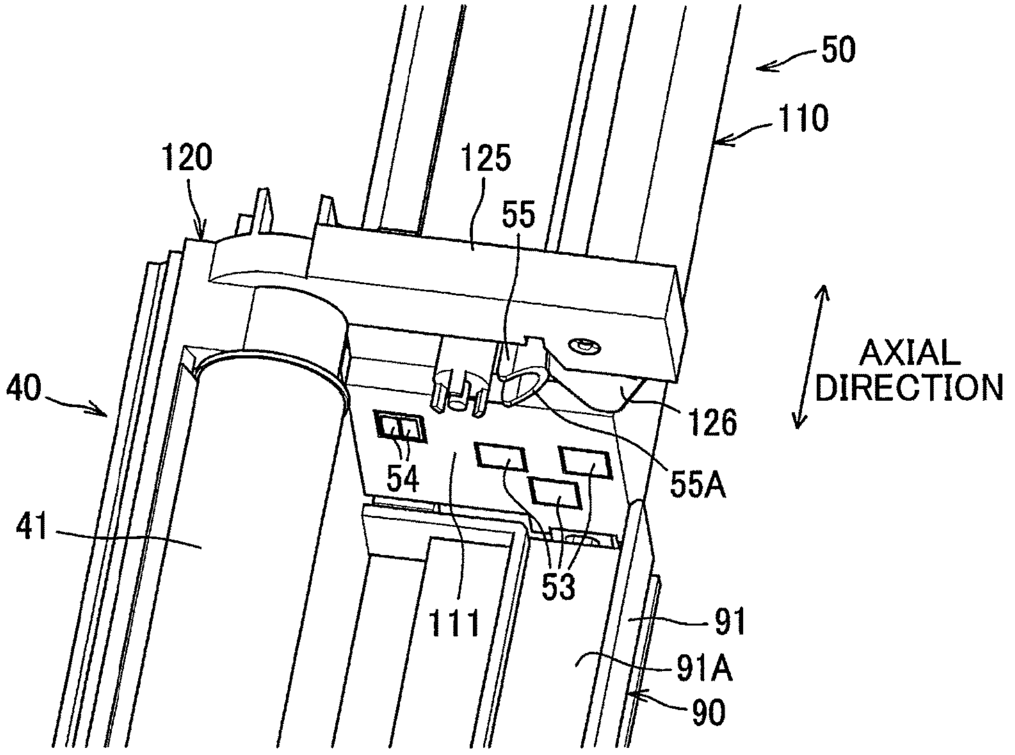
FIG. 9B is another perspective view of the developing cartridge as viewed from the side at which the first outer surface of the developing cartridge is positioned, and describes the operation in which the developing cartridge is attached after the drum cartridge is attached.

Next, as illustrated in FIG. 9A, for attachment of the developing cartridge 50 to the main body housing 2, the second protrusions 118 are aligned with the rail groove 91A of the rail 91, and at the same time, the first protrusion 117 is aligned with the guide recess 125B of the arm 125 of the drum cartridge 40. Hence, the lower end of the developing cartridge 50 is guided by the developing guide 90, and the upper end of the developing cartridge 50 is guided by the drum cartridge 40. Then, upon slight insertion of the developing cartridge 50 into the main body housing 2, the sloped surface 55A of the pressure portion 55 of the developing cartridge 50 is brought into contact with the pressing member 126 to push the pressing member 126 in a direction away from the photosensitive drum 41.

Then, in accordance with further insertion of the developing cartridge 50 into the main body housing 2, the developing cartridge 50 is guided by the developing guide 90 and the guide recess 125B and smoothly inserted into the main body housing 2. Further, although not illustrated, the other pressing member 126 provided at the end portion of the drum cartridge 40 which is far from the opening 22A is also pushed by the sloped surface 55A of the pressure portion 55. Then, upon complete insertion of the developing cartridge 50, the first protrusion 117 is positioned between the two arms 125 in the axial direction (not illustrated). Hence, interference of the developing cartridge 50 with the arms 125 does not occur even if the developing cartridge 50 moves upward relative to the drum cartridge 40. Further, the developing memory 54 of the developing cartridge 50 is brought into contact with the developing memory terminals 94, and the developing electrodes 53 of the developing cartridge 50 are brought into contact with the developing terminals 23.

Figure 10:
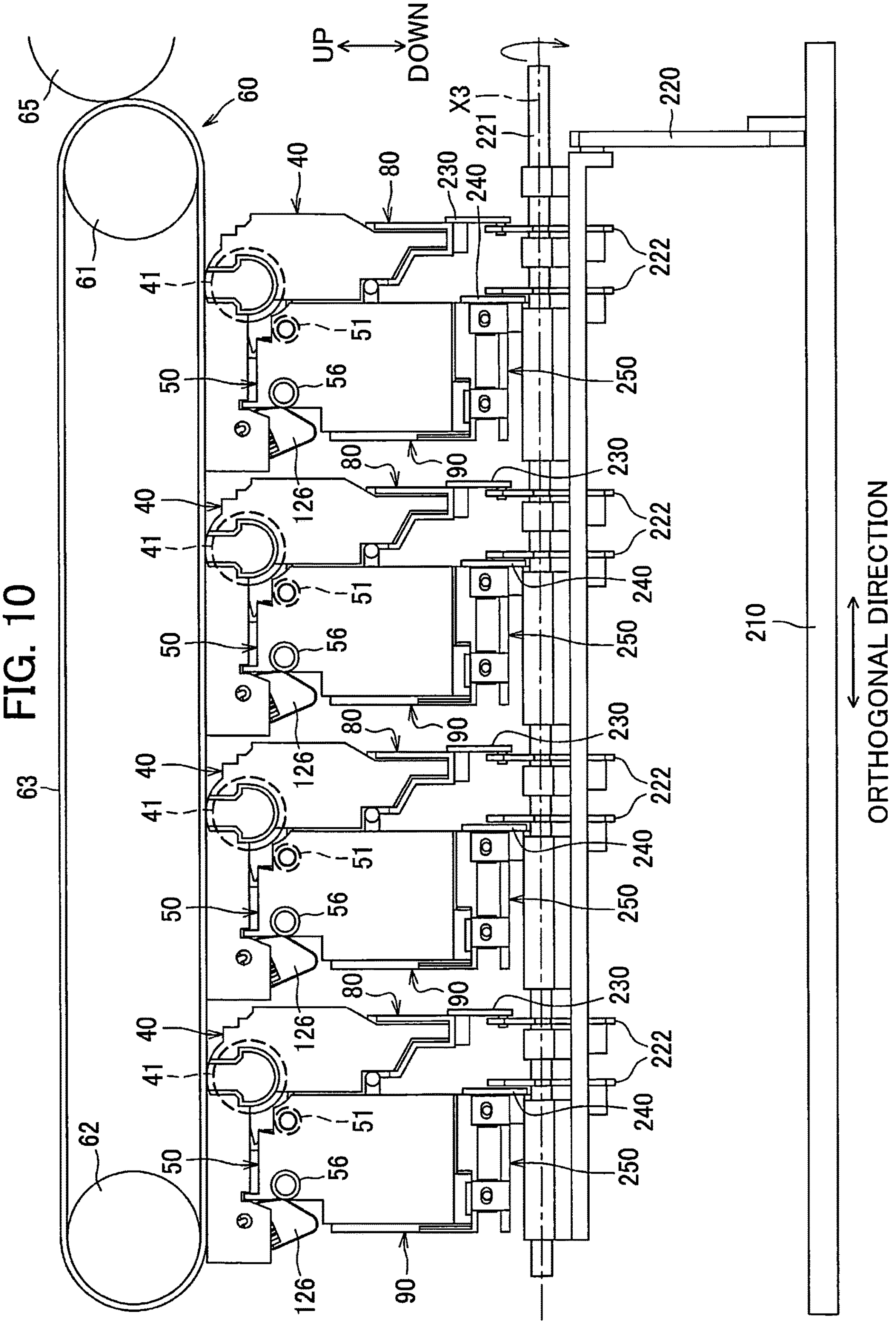
FIG. 10 is a view of the image forming apparatus from the side at which the opening is positioned, and particularly illustrates a state where the cover is at the open position and a developing guide is at a second position.

FIG. 10 illustrates a state where the four drum cartridges 40 and the four developing cartridges 50 are attached to the main body housing 2. In this state, the cover 210 is at the open position, so that each drum guide 80 is at the fourth position and each photosensitive drum 41 is separated from the intermediate transfer belt 63. Further, each developing guide 90 is at the second position, and each developing roller 51 is separated from the corresponding photosensitive drum 41.

When the cover 210 moves to the closed position, as illustrated in FIGS. 7A and 7B, the lever 222 pivotally moves, and accordingly, the slide plate 230 slidingly moves from the first sliding position to the second sliding position. Hence, the second pin 232 of the slide plate 230 pushes up the drum guide 80 to the third position. Further, as illustrated in FIGS. 8A and 8B, the slide plate 240 slidingly moves from the first sliding position to the second sliding position by pivotal movement of the corresponding lever 222. Hence, the fourth pin 242 of the slide plate 240 pushes up the table 250 to move the developing guide 90 to the first position.

Figure 11:
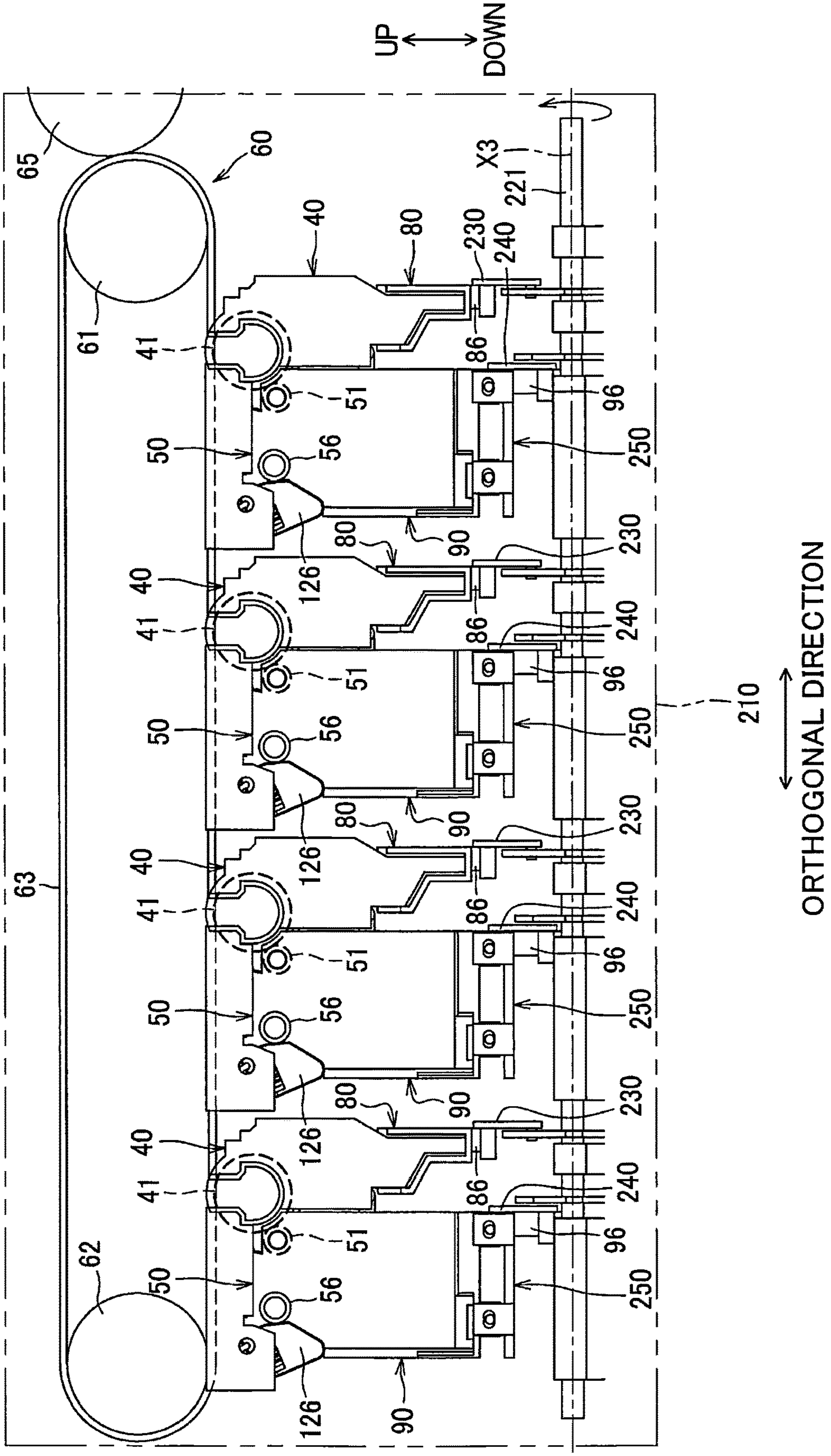
FIG. 11 is another view of the image forming apparatus from the side at which the opening is positioned, and particularly illustrates a state where the cover is at the closed position and the developing guide is at a first position.

Accordingly, as illustrated in FIG. 11, the drum cartridge 40 moves upward so that the photosensitive drum 41 is brought into contact with the intermediate transfer belt 63. Further, the developing cartridge 50 also moves upward so that the developing roller 51 is brought into contact with the corresponding photosensitive drum 41. Further, in accordance with the upward movement of the developing cartridge 50, the pressure portions 55 and 56 move the corresponding pressing members 126 in a direction away from the photosensitive drum 41, thereby compressing the springs 127. Hence, the pressing members 126 press the corresponding pressure portions 55 and 56 by the urging forces of the compressed springs 127. Consequently, the developing roller 51 can be firmly brought into pressure contact with the corresponding photosensitive drum 41.

By the movement of the developing guide 90 from the second position to the first position, the developing cartridge 50 moves upward relative to the drum cartridge 40, so that the recessed portions 124 illustrated in FIG. 9A receive the corresponding bosses 119 from below. As a result, the bosses 119 become rotatably supported by the recessed portions 124, so that the developing cartridge 50 becomes pivotally movable about the bosses 119. Then, in a case where the photosensitive drum 41 rotates, the developing roller 51 may be displaced due to minor distortion of the photosensitive drum 41, and hence, the developing cartridge 50 may be slightly pivotally moved about the bosses 119. The bosses 95 at the lower end portion of the developing guide 90 are supported by the elongated slots 252A so as to be movable leftward and rightward relative to the elongated slots 252A. This structure enables the lower end portion of the developing guide 90 to reciprocally move in the orthogonal direction while the table 250 supports the developing guide 90. Further, a separation mechanism for separating the developing roller 51 from the photosensitive drum 41 in the orthogonal direction may be provided although detailed description of the separation mechanism is omitted. In this case, the developing cartridge 50 may be largely pivotally moved about the bosses 119. Still however, the elongated slots 252A of the table 250 can allow reciprocal movement of the lower end portion of the developing guide 90 in the orthogonal direction.

Further, the developing guide 90 configured to guide attachment and detachment of the developing cartridge 50 to and from the main body housing 2 includes the developing memory terminals 94 configured to be in contact with the developing memory 54. Therefore, even in a case where the developing roller 51 is brought into contact with or separated from the photosensitive drum 41 in accordance with movement of the developing guide 90 in the up-down direction between the first position and the second position, the relative positional relationship between the developing memory 54 and the developing memory terminals 94 is unchanged. Hence, frictional wearing between the developing memory 54 and the developing memory terminals 94 can be suppressed even in a case where the developing roller 51 moves relative to the photosensitive drum 41.

Further, the support wall 92 has the hole 93 and permits contact between the developing electrodes 53 and the developing terminals 23 via the hole 93. Therefore, developing terminals need not be provided at the support wall 92. Hence, connection between the developing terminals of the support wall 92 and the electrodes of the body housing is not required. Consequently, the number of parts and components can be reduced, and stabilized contact between the developing electrodes 53 and the developing terminals 23 can be attained.

Further, since the first protrusion 117 is guided by the guide recess 125B, smooth guiding for attachment and detachment of the developing cartridge 50 can be performed.

The present disclosure is not limited to the above-described embodiment, but various embodiments may be conceivable as described below.

In the above-described embodiment, the support wall 92 has the hole 93. However, a notch can be employed in place of the hole 93.

The present disclosure is applied to the color printer in the above-described embodiment, but the present disclosure is not limited to this. Alternatively, the present disclosure may be applied to other image forming apparatuses such as a monochromatic printer, a copying machine, and a multi-function peripheral.

Parts and components in the above-described embodiment and modifications may be suitably combined together for implementation.

What is claimed is:

1. An image forming apparatus comprising:
a main body housing having an opening and including a developing memory terminal;
a developing cartridge attachable to and detachable from the main body housing in an axial direction through the opening, the developing cartridge including:
a developing roller rotatable about a first axis extending in the axial direction; and
a developing memory configured to store information therein, the developing memory being configured to come into a contact state with the developing memory terminal when the developing cartridge is attached to the main body housing; and
a drum cartridge attachable to and detachable from the main body housing in the axial direction through the opening, the drum cartridge including a photosensitive drum rotatable about a second axis extending in the axial direction,
wherein, in an attached state where the developing cartridge and the drum cartridge are attached to the main body housing, the developing roller is movable relative to the main body housing between a first position and a second position, the developing roller in the first position being closer to the photosensitive drum than the developing roller in the second position is to the photosensitive drum, and
wherein, even when the developing roller moves between the first position and the second position in the attached state, the contact state of the developing memory with the developing memory terminal is maintained.

2. The image forming apparatus according to claim 1,
wherein the developing cartridge has a first outer surface and a second outer surface positioned apart from the first outer surface in the axial direction,
wherein, in the attached state, the second outer surface is closer to the opening than the first outer surface is to the opening, and
wherein the developing memory is positioned at the first outer surface.

3. The image forming apparatus according to claim 2,
wherein the developing cartridge includes a developing coupling configured to receive driving force for rotating the developing roller, the developing coupling being positioned at the first outer surface.

4. The image forming apparatus according to claim 1, further comprising:
a cover configured to open and close the opening,
wherein the cover is movable between an open position where the cover opens the opening and a closed position where the cover closes the opening, and
wherein the developing roller moves from the second position to the first position in accordance with movement of the cover from the open position to the closed position.

5. The image forming apparatus according to claim 2,
wherein the developing cartridge further includes a developing electrode positioned at the first outer surface, the developing electrode being electrically connected to the developing roller, and
wherein the main body housing further includes a developing terminal configured to be in contact with the developing electrode in the attached state.

6. The image forming apparatus according to claim 5,
wherein the main body housing further includes a support wall facing the first outer surface in the attached state, and
wherein the support wall has a hole for allowing contact between the developing electrode and the developing terminal.

7. The image forming apparatus according to claim 1, further comprising:
an intermediate transfer belt configured to be positioned above the developing cartridge and the photosensitive drum,
wherein the photosensitive drum is positioned at an upper end portion of the drum cartridge, and
wherein the developing roller is positioned at an upper end portion of the developing cartridge.

8. The image forming apparatus according to claim 1,
wherein the developing roller is movable in an up-down direction between the first position and the second position.

9. The image forming apparatus according to claim 1,
wherein the drum cartridge further includes a drum memory configured to store therein information related to the drum cartridge.

10. The image forming apparatus according to claim 1, further comprising:
a developing guide configured to guide attachment and detachment of the developing cartridge to and from the main body housing, the developing guide being movable together with the developing cartridge between a guide first position where the developing guide places the developing roller in the first position and a guide second position where the developing guide places the developing roller in the second position.

11. The image forming apparatus according to claim 1, further comprising:
a developing guide configured to guide attachment and detachment of the developing cartridge to and from the main body housing, the developing guide having a rail groove extending in the axial direction.

12. The image forming apparatus according to claim 1, further comprising:
a sheet supply tray,
wherein, in the attached state, the sheet supply tray is positioned below the developing cartridge and the photosensitive drum.

13. An image forming apparatus comprising:
a main body housing having an opening and including a developing memory terminal;
a developing cartridge attachable to and detachable from the main body housing in an axial direction through the opening, the developing cartridge including:
a developing roller rotatable about a first axis extending in the axial direction; and
a developing memory configured to store information therein, the developing memory being configured to come into a contact state with the developing memory terminal when the developing cartridge is attached to the main body housing; and a drum cartridge attachable to and detachable from the main body housing in the axial direction through the opening independently of the developing cartridge, the drum cartridge including a photosensitive drum rotatable about a second axis extending in the axial direction, wherein, in an attached state where the developing cartridge is attached to the main body housing, the developing roller is movable relative to the main body housing between a first position and a second position, and wherein, even when the developing roller moves between the first position and the second position in the attached state, the contact state of the developing memory with the developing memory terminal is maintained.

14. The image forming apparatus according to claim 13, wherein the developing cartridge has a first outer surface and a second outer surface positioned apart from the first outer surface in the axial direction, wherein, in the attached state, the second outer surface is closer to the opening than the first outer surface is to the opening, and wherein the developing memory is positioned at the first outer surface.

15. The image forming apparatus according to claim 14, wherein the developing cartridge includes a developing coupling configured to receive driving force for rotating the developing roller, the developing coupling being positioned at the first outer surface.

16. The image forming apparatus according to claim 14, wherein the developing cartridge further includes a developing electrode positioned at the first outer surface, the developing electrode being electrically connected to the developing roller, and wherein the main body housing further includes a developing terminal configured to be in contact with the developing electrode in the attached state.

17. The image forming apparatus according to claim 16, wherein the main body housing further includes a support wall facing the first outer surface in the attached state, and wherein the support wall has a hole for allowing contact between the developing electrode and the developing terminal.

18. The image forming apparatus according to claim 13, further comprising:

a cover configured to open and close the opening, wherein the cover is movable between an open position where the cover opens the opening and a closed position where the cover closes the opening, and wherein the developing roller moves from the second position to the first position in accordance with movement of the cover from the open position to the closed position.

19. The image forming apparatus according to claim 13, further comprising:

an intermediate transfer belt configured to be positioned above the developing cartridge and the photosensitive drum, wherein the photosensitive drum is positioned at an upper end portion of the drum cartridge, and wherein the developing roller is positioned at an upper end portion of the developing cartridge.

20. The image forming apparatus according to claim 13, wherein, in a state where the developing cartridge and the drum cartridge are attached to the main body housing, the developing roller in the first position is closer to the photosensitive drum than the developing roller in the second position is to the photosensitive drum.

* * * * *